US009282853B2

(12) United States Patent
Machovina et al.

(10) Patent No.: US 9,282,853 B2
(45) Date of Patent: Mar. 15, 2016

(54) FOOD HOMOGENIZER

(71) Applicant: Healthy Foods, LLC, Cleveland, OH (US)

(72) Inventors: Brian Louis Machovina, Coral Gables, FL (US); Robert Johnson, Montville, OH (US); Robert Schmidt, Painesville, OH (US); Winston Breeden, III, Chagrin Falls, OH (US); Douglas Edward Whitner, Chagrin Falls, OH (US); Ryan Scott Crisp, Lewis Center, OH (US); Eileen McHale, Coral Gables, FL (US)

(73) Assignee: Healthy Foods, LLC, Cleveland, OH (US)

( * ) Notice: Subject to any disclaimer, the term of this patent is extended or adjusted under 35 U.S.C. 154(b) by 236 days.

(21) Appl. No.: 14/076,757

(22) Filed: Nov. 11, 2013

(65) Prior Publication Data
US 2014/0061345 A1   Mar. 6, 2014

Related U.S. Application Data

(60) Continuation-in-part of application No. 14/023,944, filed on Sep. 11, 2013, now Pat. No. 8,925,845, which is a division of application No. 13/108,112, filed on May 16, 2011, now Pat. No. 8,550,390.

(Continued)

(51) Int. Cl.
*A47J 43/07*      (2006.01)
*A47J 43/046*    (2006.01)
*A47J 43/08*      (2006.01)

(52) U.S. Cl.
CPC ............... *A47J 43/07* (2013.01); *A47J 43/046* (2013.01); *A47J 43/0722* (2013.01); *A47J 43/085* (2013.01)

(58) Field of Classification Search
CPC ....... A47J 43/07; A47J 43/06; A47J 43/0722; A47J 43/046
USPC ...................... 241/222, 224, 260.1, 261.2, 92
See application file for complete search history.

(56) References Cited

U.S. PATENT DOCUMENTS 1,727,410 A   9/1929 Poesse
2,228,025 A   1/1941 Apfelbeck
(Continued)

FOREIGN PATENT DOCUMENTS

EP   1475024 A1   11/2004
JP   S56169837   5/1955
(Continued)

OTHER PUBLICATIONS

International Search Report dated Feb. 7, 2014.
(Continued)

*Primary Examiner* — Faye Francis
(74) *Attorney, Agent, or Firm* — Cooper Legal Group LLC

(57) ABSTRACT

A food homogenizer includes a drive assembly including a driving motor. The driving motor engages a rotatable mating portion that extends along a rotation axis. A homogenizer assembly is removably attached with respect to the drive assembly. The homogenizer assembly includes a homogenizing chamber, a blade assembly positioned within the homogenizing chamber and a driven shaft that extends from the blade assembly along the rotation axis. The driven shaft is received within the mating portion such that rotation of the mating portion by the driving motor causes rotation of the blade assembly about the rotation axis. A supply assembly engages a receiving opening in the homogenizer and supplies a food product. The food homogenizer includes a rinse system including a drive assembly that engages a homogenizer assembly. The rinse system includes a dispenser assembly that dispenses a liquid to the homogenizer assembly.

15 Claims, 12 Drawing Sheets

Related U.S. Application Data

(60) Provisional application No. 61/725,137, filed on Nov. 12, 2012, provisional application No. 61/789,822, filed on Mar. 15, 2013, provisional application No. 61/378,662, filed on Aug. 31, 2010, provisional application No. 61/440,939, filed on Feb. 9, 2011.

(56) References Cited

U.S. PATENT DOCUMENTS

| | | |
|---|---|---|
| 2,567,371 A | 9/1951 | Forkey et al. |
| 2,649,317 A | 8/1953 | Leuze |
| 2,840,130 A | 6/1958 | Schwarz |
| 3,249,310 A | 5/1966 | Willems |
| 3,514,079 A | 5/1970 | Little, Jr. |
| 3,933,317 A | 1/1976 | Rovere |
| 3,976,001 A | 8/1976 | Trovinger |
| 4,081,145 A | 3/1978 | Moe et al. |
| 4,095,751 A | 6/1978 | Artin |
| 4,227,656 A | 10/1980 | Engebretsen |
| 4,311,315 A | 1/1982 | Kronenberg |
| 4,387,860 A | 6/1983 | Necas et al. |
| 4,390,133 A | 6/1983 | Wanat |
| 4,700,903 A | 10/1987 | Henn |
| 4,844,362 A | 7/1989 | Revnivtsev et al. |
| 4,856,718 A | 8/1989 | Gaber et al. |
| 4,884,755 A | 12/1989 | Hedrington |
| 4,948,614 A | 8/1990 | Feldpausch |
| 4,955,724 A | 9/1990 | Otto |
| 5,098,731 A | 3/1992 | Feldpausch |
| 5,201,529 A | 4/1993 | Heinzen |
| 5,233,916 A | 8/1993 | Butler et al. |
| 5,246,175 A | 9/1993 | Feldpausch |
| 5,297,475 A | 3/1994 | Borger et al. |
| 5,495,795 A | 3/1996 | Harrison et al. |
| 5,584,577 A | 12/1996 | Thies |
| 5,613,430 A | 3/1997 | Lee |
| 5,675,228 A | 10/1997 | O'Bryan |
| 5,680,997 A | 10/1997 | Hedrington |
| 5,806,413 A | 9/1998 | Trovinger |
| 5,896,812 A | 4/1999 | Basora et al. |
| 5,906,154 A | 5/1999 | Yoon et al. |
| 6,029,568 A | 2/2000 | Pascotti et al. |
| 6,050,180 A | 4/2000 | Moline |
| 6,112,649 A | 9/2000 | Jeong |
| 6,210,033 B1 | 4/2001 | Karkos, Jr. et al. |
| 6,350,053 B1 | 2/2002 | Morin |
| 6,394,377 B1 | 5/2002 | Kim et al. |
| 6,554,466 B1 | 4/2003 | Lee |
| 6,604,454 B1 | 8/2003 | Tateno |
| 6,606,939 B1 | 8/2003 | Tateno |
| 6,637,323 B2 | 10/2003 | Kim |
| 6,722,268 B2 | 4/2004 | Catelli |
| 6,748,853 B1 | 6/2004 | Brady et al. |
| 6,766,731 B1 | 7/2004 | Lavi et al. |
| 6,814,323 B2 | 11/2004 | Starr et al. |
| 6,854,382 B2 | 2/2005 | Jan |
| 6,910,800 B2 | 6/2005 | Wu |
| 6,968,777 B2 | 11/2005 | Lin |
| 7,028,607 B2 | 4/2006 | Zweben |
| 7,036,758 B2 | 5/2006 | Hamada et al. |
| 7,063,009 B2 | 6/2006 | Lin |
| 7,080,594 B2 | 7/2006 | Lin |
| D539,315 S | 3/2007 | Zweben |
| 7,217,028 B2 | 5/2007 | Beesley |
| 7,422,361 B2 | 9/2008 | Pryor, Jr. et al. |
| 7,665,885 B2 | 2/2010 | Pryor, Jr. |
| 7,690,592 B2 | 4/2010 | Ferraby |
| 7,861,958 B2 | 1/2011 | Waznys et al. |
| 7,900,860 B2 | 3/2011 | Waznys et al. |
| D682,606 S | 5/2013 | Machovina et al. |
| 2001/0008258 A1 | 7/2001 | Robordosa et al. |
| 2002/0012288 A1 | 1/2002 | Masip |
| 2003/0226923 A1 | 12/2003 | Starr et al. |
| 2006/0029709 A1 | 2/2006 | Zweben |
| 2006/0065133 A1 | 3/2006 | Moline |
| 2007/0107609 A1 | 5/2007 | Barker et al. |
| 2007/0296153 A1 | 12/2007 | Kurth et al. |
| 2008/0106043 A1 | 5/2008 | Escriva Estruch |
| 2009/0064875 A1 | 3/2009 | Trovinger |
| 2009/0272280 A1 | 11/2009 | Cheung et al. |
| 2009/0309310 A1 | 12/2009 | Wilson |
| 2010/0058940 A1 | 3/2010 | Rivera |
| 2010/0282886 A1 | 11/2010 | Pallmann |
| 2010/0288139 A1 | 11/2010 | Li et al. |
| 2011/0095115 A1 | 4/2011 | Waznys et al. |
| 2012/0048977 A1 | 3/2012 | Machovina et al. |

FOREIGN PATENT DOCUMENTS

| | | |
|---|---|---|
| JP | S5884019 | 6/1983 |
| JP | S5884021 | 6/1983 |
| JP | S61479626 | 3/1986 |
| KR | 100433172 | 5/2004 |
| WO | 2007148872 A1 | 12/2007 |
| WO | 2012030480 A2 | 3/2012 |

OTHER PUBLICATIONS

Corresponding Japanese Application, Japanese Office action dated Feb. 10, 2015.

FOOD HOMOGENIZER

CROSS REFERENCE TO RELATED APPLICATIONS

This application claims the benefit of U.S. Provisional Application Nos. 61/725,137, filed on Nov. 12, 2012, and 61/789,822, filed on Mar. 15, 2013, and is a continuation in part of U.S. patent application Ser. No. 14/023,944, filed on Sep. 11, 2013, which is a divisional of U.S. patent application Ser. No. 13/108, 112, filed on May 16, 2011, now U.S. Pat. No. 8,550,390, which claims the benefit of U.S. Provisional Application Nos. 61/378,662, filed on Aug. 31, 2010 and 61/440,939, filed on Feb. 9, 2011, the entire disclosures of which are hereby incorporated herein by reference.

BACKGROUND OF THE INVENTION

1. Field of the Invention

The present invention relates generally to a food homogenizer that easily enables people, through an easy to operate machine, to make a dessert/treat from frozen fruits, nuts, chocolates, non-frozen foods, and/or other ingredients.

2. Discussion of the Prior Art

Ice cream, sherbet, and frozen similar frozen desserts/treats are well liked by many people, but the opportunity to easily make frozen desserts/treats at home from healthy ingredients can be a challenge. Also, there are many opportunities for people to enjoy cream, sherbet, and frozen similar frozen desserts/treats outside of the home from various retail providers. However, selecting/obtaining such a dessert/treat that has all healthy ingredients can be a challenge.

There is a need for people, through an easy to operate machine, to be able to make a healthy dessert/treat from frozen fruits, nuts, chocolates, non-frozen foods, and/or other ingredients. Specifically, there is a need for an easy to operate machine that is able to make a healthy dessert/treat from frozen fruits, etc. by homogenizing the ingredients into a soft texture with a similar consistency as ice cream and sherbet outside of the home and possibly in a retail environment.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a food homogenizer including a drive assembly including a driving motor. The driving motor engages a rotatable mating portion that extends along a rotation axis. The food homogenizer includes a homogenizer assembly removably attached with respect to the drive assembly. The homogenizer assembly includes a homogenizing chamber and a blade assembly positioned within the homogenizing chamber. The homogenizer assembly includes a driven shaft that extends from the blade assembly along the rotation axis. The driven shaft is received within the mating portion such that rotation of the mating portion by the driving motor causes rotation of the blade assembly about the rotation axis.

In accordance with another aspect, the present invention provides a food homogenizer including a drive assembly including a driving motor. The driving motor engages a rotatable mating portion that extends along a rotation axis. The food homogenizer includes a homogenizer assembly that is removably attached with respect to the drive assembly. The homogenizer assembly includes a homogenizing chamber, a blade assembly disposed within the homogenizing chamber, and a driven shaft that extends from the blade assembly along the rotation axis. The driven shaft is received within the mating portion such that rotation of the mating portion by the driving motor causes rotation of the blade assembly about the rotation axis. The food homogenizer includes a supply assembly configured to engage a receiving opening in the homogenizing chamber. The supply assembly contains a food product that is configured to be supplied to an interior of the homogenizing chamber such that rotation of the blade assembly homogenizes the food product.

In accordance with another aspect, the present invention provides a food homogenizer including a rinse system including a drive assembly configured to engage a homogenizer assembly such that a blade assembly of the homogenizer assembly is rotatable by the drive assembly. The rinse system includes a dispenser assembly configured to dispense a liquid. The dispenser assembly engages the homogenizer assembly such that the liquid is dispensed through an opening in the homogenizer assembly to the rotatable blade assembly.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
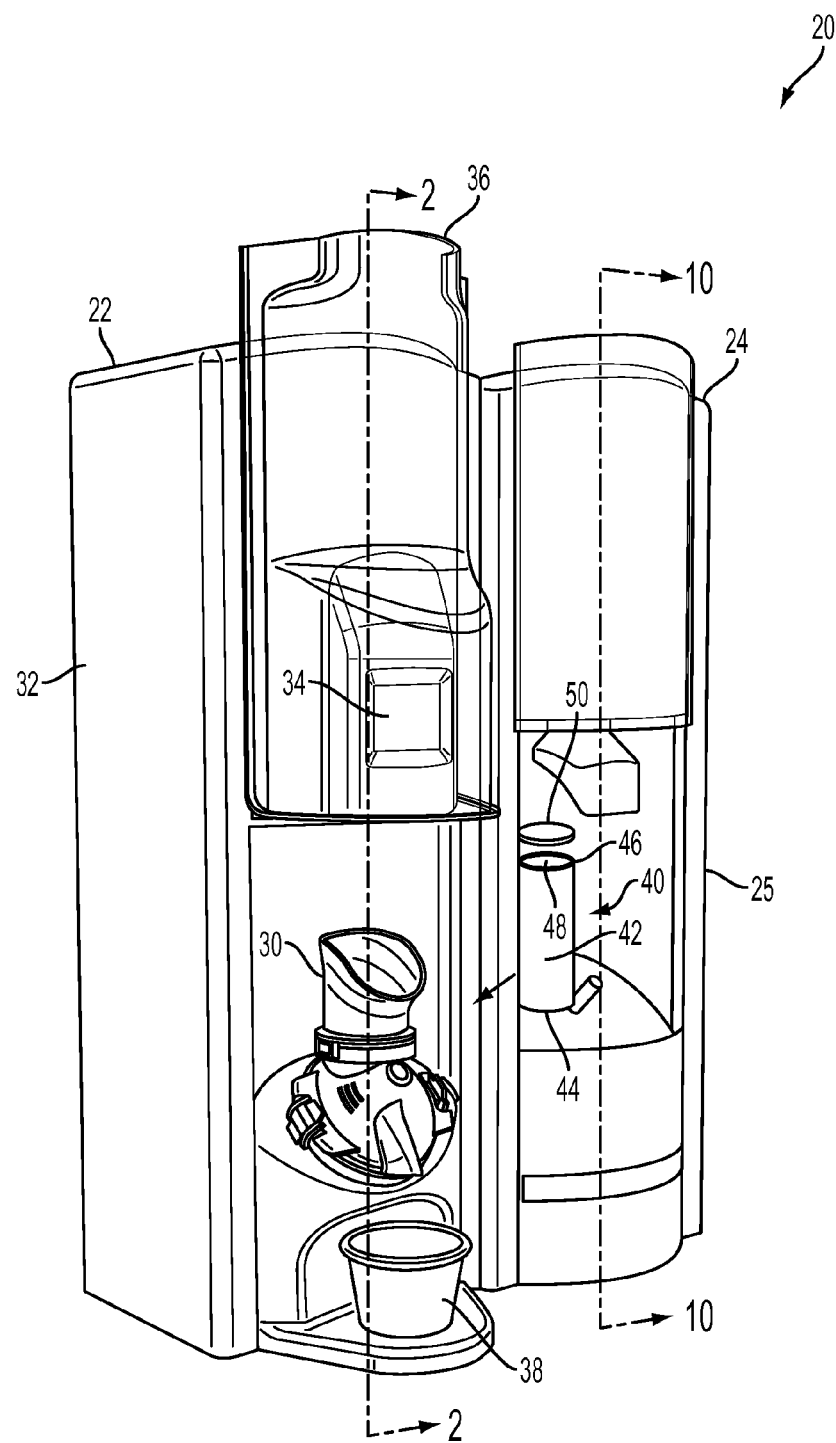
FIG. 1 is perspective view of an example food homogenizer including a homogenizer system and a rinse system in accordance within at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 illustrates an example food homogenizer 20 that is capable of shredding and homogenizing food. The food homogenizer 20 includes a homogenizer system 22 that is capable of blending various types of food product, including frozen fruits, nuts, chocolates, ice cream, ice, etc. However, a particular usefulness is associated with the shredding and homogenizing of frozen fruit.

The blended food product may have a soft puree texture with a similar consistency to ice cream, sherbet, frozen yogurt, or the like. Though it is understood that the term "homogenize" refers to a uniform mixture of elements, as used herein, the term "homogenize" can include a somewhat uniform mixture of elements, and may also encompass non-uniform mixture of elements depending upon the particular food product being used and the degree to which they are shredded/broken down by the homogenizer system 22.

The food homogenizer 20 includes a rinse system 24. In some examples, the rinse system 24 is adjacent and/or attached to the homogenizer system 22. The rinse system 24 includes a rinse housing 25 that includes one or more walls that define an interior (illustrated in FIG. 10) into which components, structures, etc. are housed. As will be described in more detail below with respect to FIGS. 10 to 12, the rinse system 24 can rinse/clean a homogenizer assembly 30 after the blending/homogenization of the food product.

Focusing upon the homogenizer system 22, the homogenizer system 22 can include a homogenizer housing 32. The homogenizer housing 32 includes one or more walls that define an interior (illustrated in FIG. 2) into which components, structures, etc. are housed. The homogenizer housing 32 can support an interface 34 that can visually display information to a user. In some examples, the interface 34 is configured such that the user can enter/input information (e.g., operating parameters, options, or the like) to the homogenizer system 22. While the interface 34 is illustrated as being positioned at a front of the homogenizer housing 32, such as position is not intended to be limiting. Rather, in other examples, the interface 34 may be located on a sidewall of the homogenizer housing 32, or the like.

The homogenizer system 22 can include a cover 36. In an example, the cover 36 is movable with respect to the homogenizer housing 32 between a raised position (as illustrated) and a lowered position. The cover 36 can provide a number of functions, including a safety function (e.g., by limiting a user from accessing the homogenizer assembly 30 during operation), a cleanliness function (e.g., by reducing spilling or other unintended/unintentional scattering of the food product), etc. In some examples, a container 38 can be supported by the homogenizer housing 32 to receive the food product. The container 38 can be covered by the cover 36 when the cover 36 is in the lowered position.

The food homogenizer 20 includes a supply assembly 40 that can assist in supplying the food product to be homogenized. FIG. 1 shows a portion of the supply assembly 40. In an example, the supply assembly 40 includes a cartridge 42. The cartridge 42 defines an elongated structure that extends between a first end 44 and an opposing second end 46. The cartridge 42 of the supply assembly 40 defines a hollow interior 48 into which the food product can be received. In one particular example, the food product within the cartridge is frozen fruit. The frozen fruit may be fruit pieces (e.g., banana pieces) or whole fruit (e.g., whole berries). Also, the frozen fruit may be a single fruit type (e.g., only banana pieces) or may be a mixture of fruit types (i.e., banana and berry pieces).

The cartridge 42 includes any number of sizes, shapes, and structures. For example, as illustrated in FIG. 1, the cartridge 42 has a cylindrical shape with a substantially circular cross-section. The cartridge 42 is not limited to this structure, however, and in other examples, may include an oval cross-section, ovoid cross-section, quadrilateral (e.g., square, rectangular, etc.) cross-section, polygonal (e.g., multi-sided) cross-section or the like. Likewise, the cartridge 42 includes any number of dimensions, such as by being longer or shorter than as illustrated, or defining a larger or smaller cross-sectional size than as illustrated.

The supply assembly 40 can include a plunger 50 (schematically shown within FIG. 1). In some examples, the plunger 50 has a cross-sectional shape (e.g., circular, for example) that substantially matches a cross-sectional shape of the interior 48 of the cartridge 42. Likewise, the plunger 50 may have a cross-sectional size that is smaller or slightly smaller than the cross-sectional size of the interior 48, such that the plunger 50 may be received within the cartridge 42. It will be appreciated that FIG. 1 illustrates the plunger 50 as being disconnected/disassembled from the cartridge 42 for illustrative purposes. However, in use/operation, the plunger 50 is positioned within the cartridge 42. In at least one example, the plunger 50 is supported at the second end 46 within the interior 48 of the cartridge 42. As will be described in more detail below, the plunger 50 can be movably supported with respect to the cartridge 42.

Figure 2:
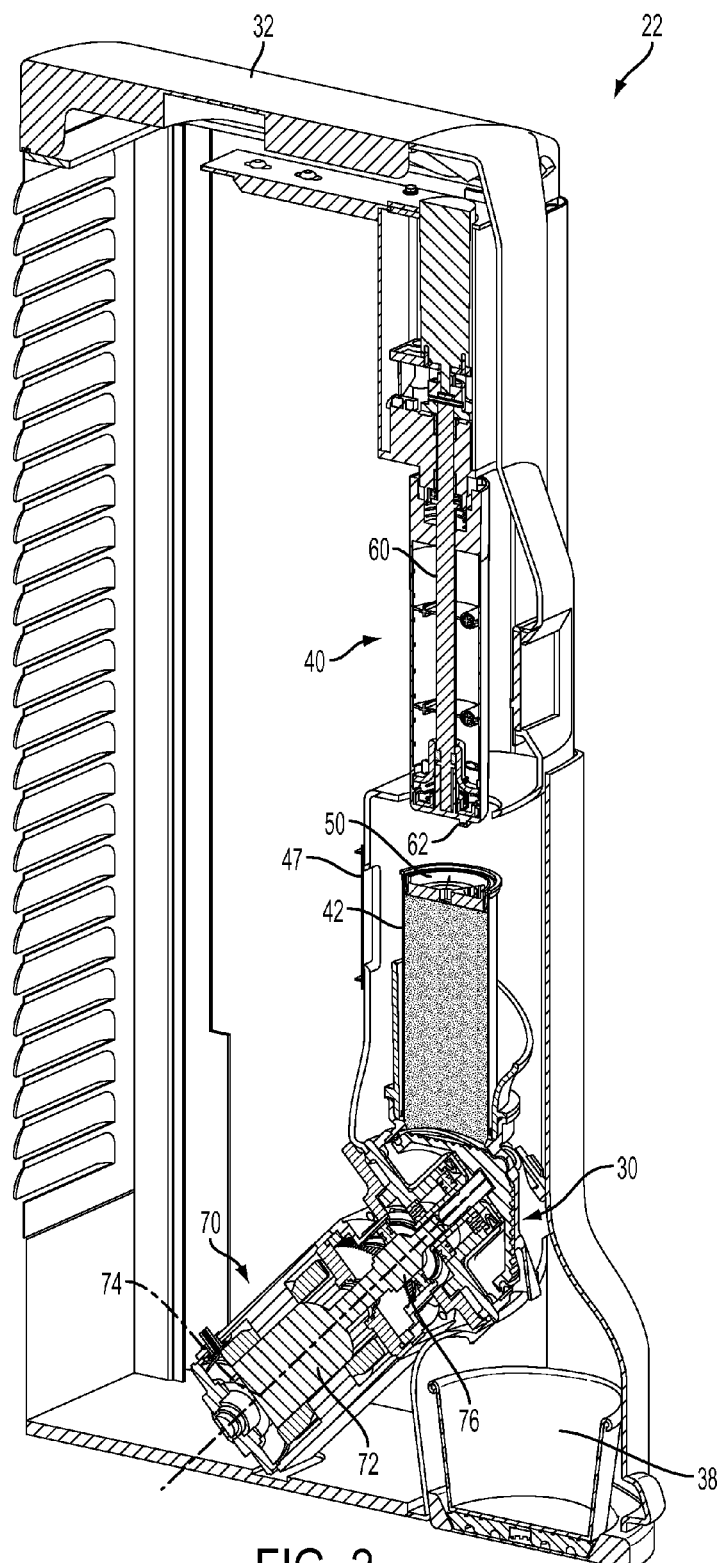
FIG. 2 is a sectional view of the homogenizer system along line 2-2 of FIG. 1 in which an example cartridge is supported by an example homogenizer assembly.

Turning to FIG. 2, a sectional view of the homogenizer system 22 along line 2-2 of FIG. 1 is illustrated. It will be appreciated that in this example, the cartridge 42 is illustrated in an engaged/supported position with respect to the homogenizer system 22 (in contrast to the detached position of FIG. 1). Further, it will be appreciated that not all of the internal structures are illustrated in FIG. 2 for ease of illustration. Indeed, in some examples, the homogenizer system 22 may include electronics/circuitry, mechanical structures (pumps, gears, actuators, etc.), or the like.

Figure 8:
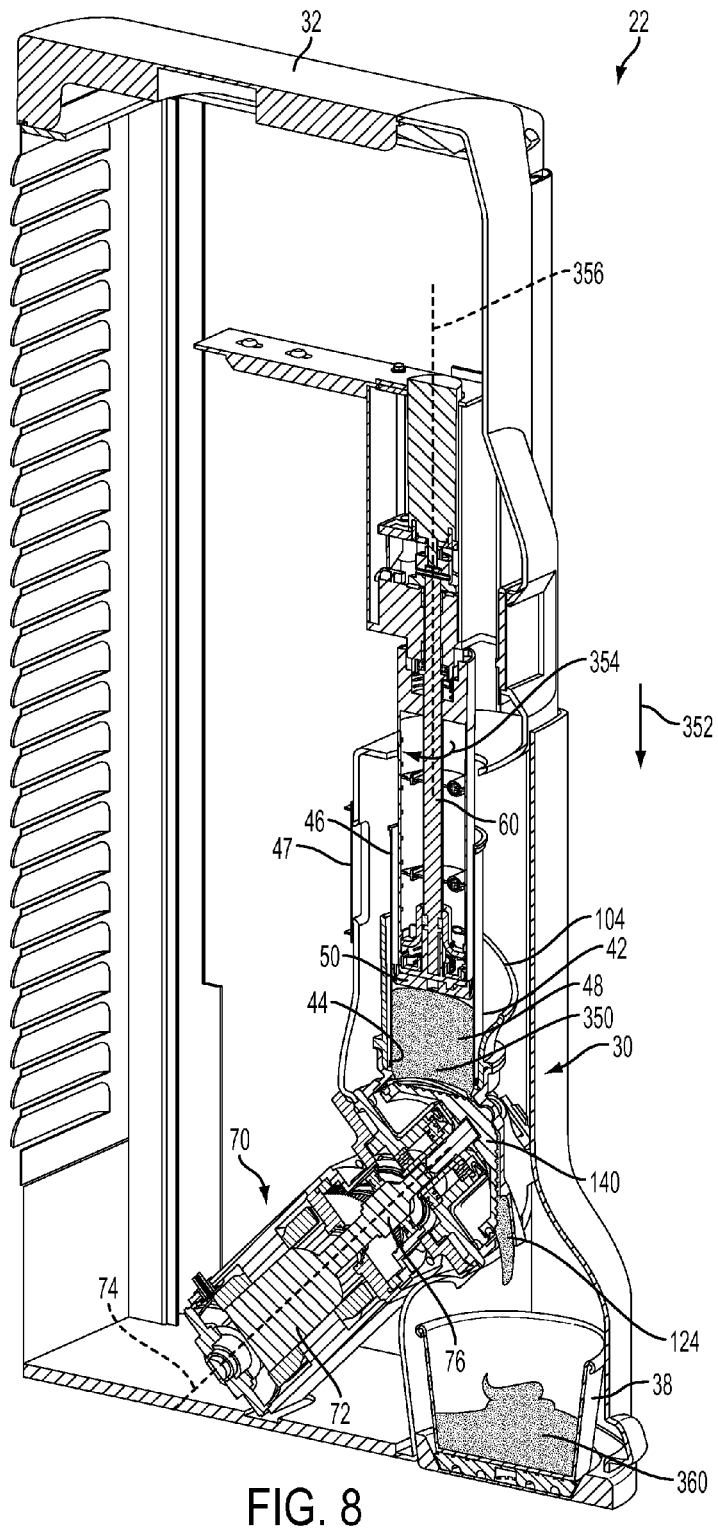
FIG. 8 is a sectional view of the example food homogenizer, similar to FIG. 2, but with an example force application device engaging a plunger located within the cartridge in which frozen food is located within the cartridge.
Figure 9:
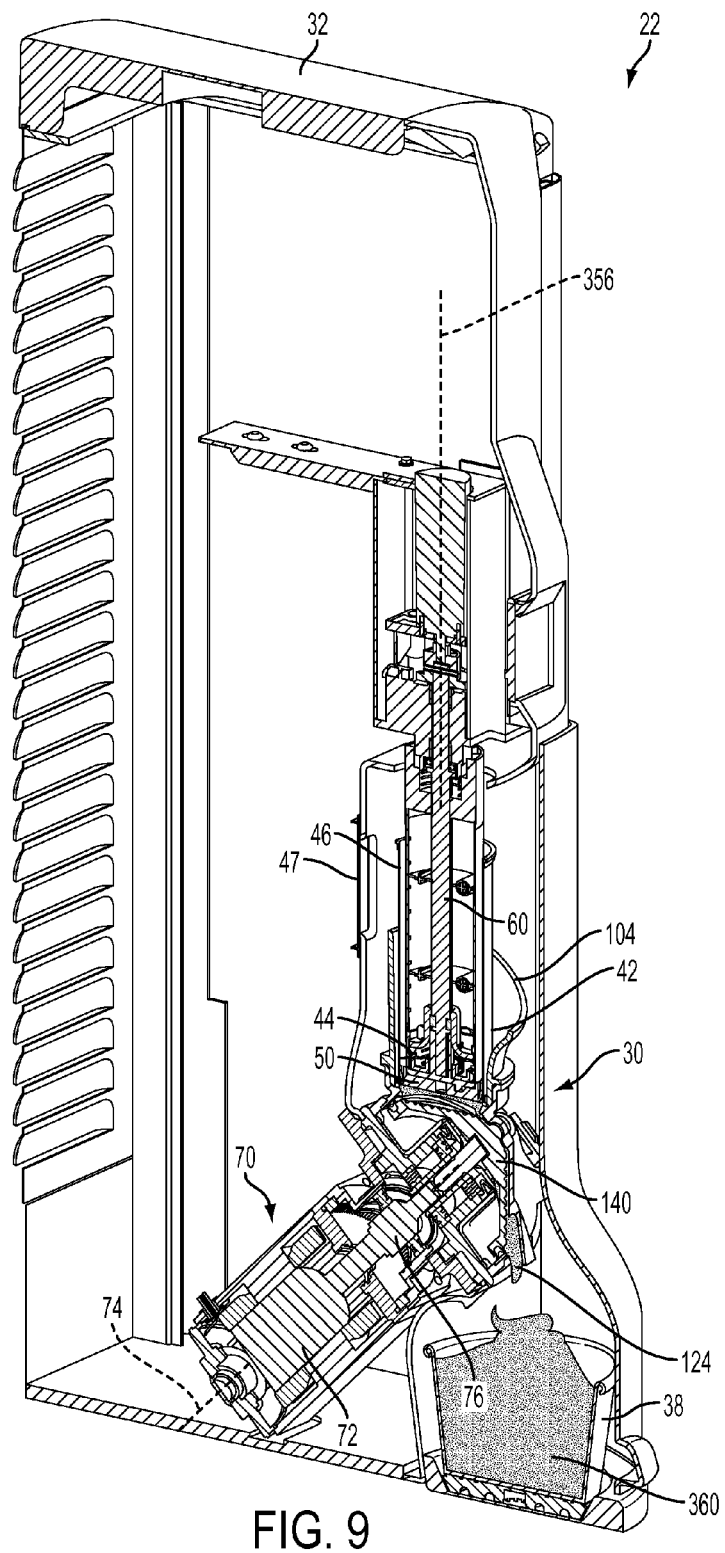
FIG. 9 is a sectional view of the food homogenizer similar to FIG. 8, but with the plunger moved adjacent to a blade assembly and substantially all of the frozen food expelled from the cartridge, against the blade assembly for shredding and homogenizing, and into a serving container.

The supply assembly 40 of the food homogenizer 20 includes a force application device 60 (also illustrated in FIGS. 8 and 9). The force application device 60 is located within the homogenizer system 22 and the location therein and the operation to provide the force will be presented and described in further detail following. The force application device 60 is supported within the homogenizer housing 32, and can apply a downward force to the plunger 50 by engaging a surface of the plunger.

Focusing still upon the force application device 60, in some examples, the force application device 60 includes one or more engagement structures 62 extending downwardly from the force application device 60 towards the plunger 50. In some examples, two engagement structures 62 are provided, though, in other examples, any number of engagement structures 62 (e.g., one or more) can be provided. Additionally, the engagement structure(s) 62 can be substantially identical in size, shape, and structure, or, in other examples, may have different sizes, shapes, structures, etc.

Referring still to FIG. 2, the homogenizer system 22 can include a drive assembly 70 disposed below and spaced apart from the force application device 60. The drive assembly 70 includes a driving motor 72 supported within the homogenizer housing 32. The driving motor 72 is illustrated generically/schematically in FIG. 2 for ease of illustration, as the driving motor 72 includes any number of constructions, sizes, shapes, etc. The driving motor 72 can be fixedly supported within the homogenizer housing 32 by one or more supports or fasteners (e.g. nuts, bolts, screws, adhesives, mechanical locking devices, etc.). The driving motor 72 can directly or indirectly supply rotational motion about a rotation axis 74. In some examples, the driving motor 72 can include a gearbox, step-down gearbox, or the like that increases the torque supplied from the driving motor 72 while reducing rotational motion speed.

The driving motor 72 can engage and rotate a drive shaft 76. The drive shaft 76 is supported at least partially within the homogenizer housing 32. The drive shaft 76 can be attached to an output shaft of the driving motor, such that the drive shaft 76 extends generally along the rotation axis 74. In some examples, the driving motor 72 can cause rotation of the drive shaft 76 about the rotation axis 74. In at least one example, the homogenizer assembly 30 can be removably attached with respect to drive assembly 70. In particular, the homogenizer assembly 30 is removably attached to the drive shaft 76, such that rotation of the drive shaft 76 can cause corresponding rotation of at least a portion of the homogenizer assembly 30.

Figure 3:
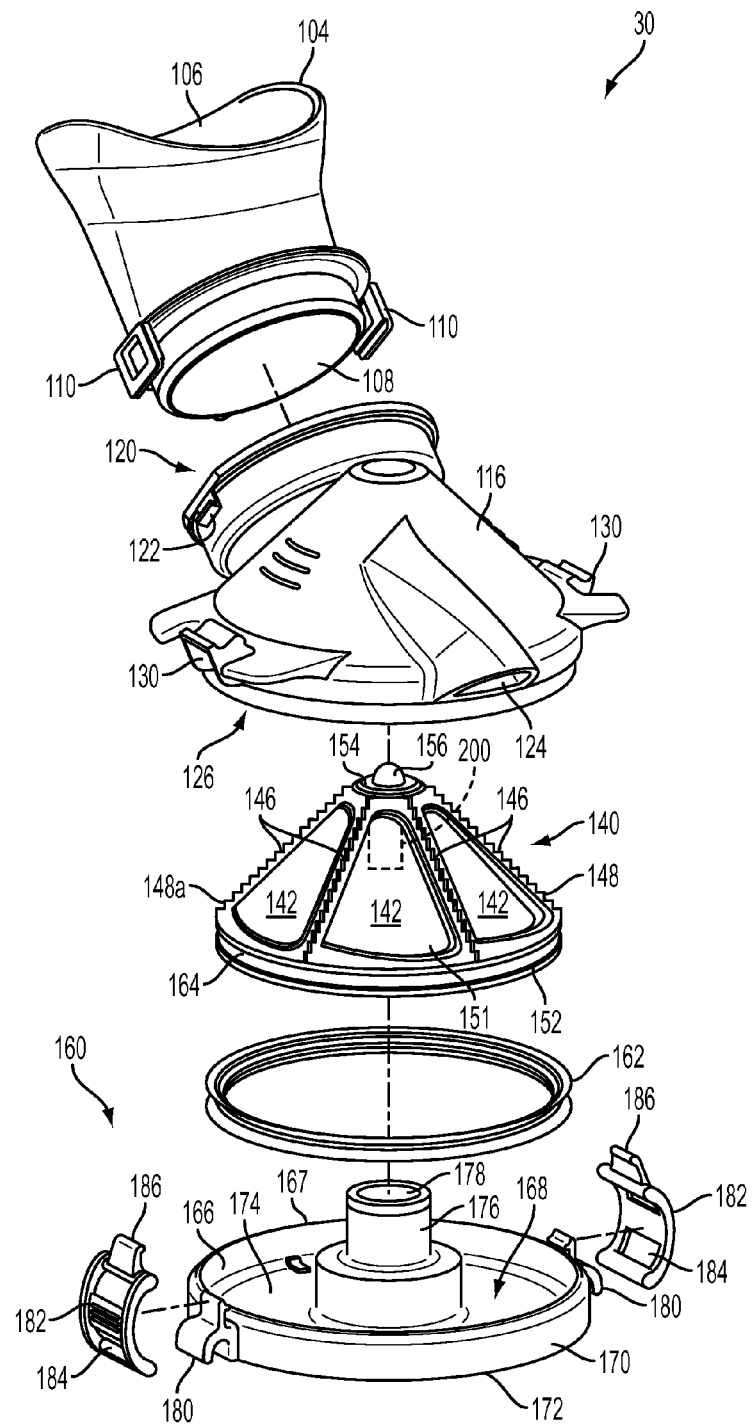
FIG. 3 is a partially exploded perspective view of the example homogenizer assembly, in accordance with at least one aspect of the present invention.

Turning now to FIG. 3, the homogenizer assembly 30 is illustrated in more detail. It will be appreciated that the homogenizer assembly 30 is illustrated as being partially exploded for illustrative purposes. Further, in an effort to illustrate details of the homogenizer assembly 30, the homogenizer assembly 30 is illustrated separate from the homogenizer system 22. In operation, however, and as will be described in more detail below, the homogenizer assembly 30 can be attached with respect to the drive assembly 70 to cause rotation of at least a portion of the homogenizer assembly 30.

The homogenizer assembly 30 can include a receiving structure 104. The receiving structure 104 defines a substantially hollow chute, channel, trough, or the like. In some examples, the receiving structure 104 includes a first receiving opening 106 and an opposing second receiving opening 108. The first receiving opening 106 is sized/shaped to receive a portion of the supply assembly 40, such as the cartridge 42 (illustrated in FIGS. 1 and 2). In some examples, an interior of the first receiving opening 106 has a polygonal shape that substantially matches an outer shape (e.g., matching polygonal shape) of the first end 44 of the cartridge 42. In such an example, the cartridge 42 is generally non-movable/non-rotatable with respect to the first receiving opening 106 of the receiving structure 104. It will be appreciated that the receiving structure 104 includes any number of sizes, shapes, dimensions, or the like, and is not specifically limited to the example of FIG. 3.

The receiving structure 104 can include at least one receiving attachment structure 110. In the illustrated example, the at least one receiving attachment structure 110 includes a pair of receiving attachment structures 110. In this example, the receiving attachment structures 110 are positioned at substantially opposite sides of the receiving structure 104 in proximity to the second receiving opening 108. However, such a position is not intended to be limiting, and in other examples, the receiving attachment structures 110 may be positioned closer to/farther from the second receiving opening 108. The receiving attachment structures 110 include an outwardly deformable snap fit structure that is capable of releasably gripping a corresponding structure. It will be appreciated, however, that the receiving attachment structures 110 are not limited to the illustrated design/construction, and include any number of structures that have a fastening/attaching capability, including fasteners (e.g., screws, nuts, bolts, etc.), adhesives, magnets, or the like.

The receiving structure 104 can be attached to a homogenizing chamber 116. The homogenizing chamber 116 has a generally conic shape with a receiving opening 120 extending through the homogenizing chamber 116. In some examples, the receiving opening 120 defines a pathway between an exterior and an interior of the homogenizing chamber 116. In an example, the receiving opening 120 has a size/shape that substantially matches a size/shape of the second receiving opening 108 of the receiving structure 104. In some examples, the receiving opening 120 of the homogenizing chamber 116 can at least partially receive the second receiving opening 108 and the receiving structure 104 therein.

The homogenizing chamber 116 can include at least one attachment structure 122 positioned adjacent the receiving opening 120. In the illustrated example, the at least one attachment structure 122 includes two attachment structures 122 disposed on substantially opposite sides of the receiving opening 120. While any number of positions for the attachment structure(s) 122 are envisioned, in some examples, the attachment structures 122 can substantially match a position of the receiving attachment structures 110. In an example, the attachment structure 122 defines an outwardly extending ledge, protrusion, outcropping, or the like. The attachment structures 122 are sized/shaped to engage and/or mate with the receiving attachment structures 110. As such, the receiving attachment structures 110 can releasably grip the attachment structures 122, such that the receiving structure 104 is releasably attached to the homogenizing chamber 116.

The homogenizing chamber 116 can include a dispensing opening 124. The dispensing opening 124 defines an aperture, hole, orifice, etc. that extends from an interior to an exterior of the homogenizing chamber 116. In some examples, the dispensing opening 124 is sized to allow for the food product to exit the homogenizing chamber 116. The homogenizing chamber 116 can include a chamber opening 126 located at an end of the homogenizing chamber 116 substantially opposite the receiving opening 120.

The homogenizing chamber 116 can include at least one chamber attachment structure 130 positioned adjacent the chamber opening 126. In an example, the chamber attachment structure 130 defines an outwardly extending ledge, protrusion, outcropping, or the like that projects radially from an outer surface of the homogenizing chamber 116. In the illustrated example, there is at least one chamber attachment structure 130 that includes two chamber attachment structures 130 disposed on substantially opposite sides of the chamber opening 126.

The homogenizing chamber 116 is sized and shaped to receive a blade assembly 140. The blade assembly 140 has a generally conic shape that substantially matches the conic shape of the homogenizing chamber 116. In some examples, the blade assembly 140 includes at least one depression 142 disposed between adjacent blade rows 146. In the illustrated example, the blade assembly 140 includes a total of six depressions 142, though any number of depressions 142 can be provided. The depressions 142 can each have identical, similar, or different geometries. In an example, the depressions 142 can include a generally triangular geometry that follows the generally conic geometry of the blade assembly 140. In at least some examples, the depressions 142 may have sloping edges/sides to facilitate the flow of shredded/homogenized food product into and out of the depressions 142. The interaction between the depressions 142 and an inner surface 150 (illustrated in FIG. 7) of the homogenizing chamber 116 can create a pumping-type action to facilitate movement and/or homogenization of the food product.

The blade assembly 140 can include one or more of the blade rows 146. In the illustrated example, the blade assembly 140 includes a total of six blade rows 146, with each blade row 146 disposed between a pair of depressions 142. However, it will be appreciated that any number of blade rows 146 can be provided. In some examples, the blade rows 146 can extend along a surface 151 of the blade assembly 140 from a first end 152 to an opposing second end 154. The blade rows 146 may extend partially from the first end 152 to the second end 154 (e.g., less than an entire length, as illustrated), or, in other examples, may extend the entire length from the first end 152 to the second end 154. In the illustrated example, the blade rows 146 are substantially equally spaced apart about the surface 151, though, in other examples, the blade rows 146 may be arranged in various groupings, patterns, randomly, etc.

The blade rows 146 include a plurality of blades 148 that extend along a length of the blade rows 146. The blades 148 include any number of different geometries and/or cutting features. In the illustrated examples, the blades 148 are serrated so as to provide a greater cutting and/or shredding action. For example, each of the blades 148 can have one or more teeth that form a repeating, triangular blade 148a that forms a peak and valley serration. The blades 148 are not limited to including the triangular blade 148a of FIG. 3, as other serration patterns are contemplated. For example, the blades 148 can also include truncated blades 148b (illustrated in FIG. 7) that have a generally triangular shape with a truncated, flattened peak. In the illustrated example, each blade row 146 includes the triangular blades 148a or the truncated blades 148b, with the blade rows 146 alternating in shapes (e.g., triangular blades 148a or truncated blades 148b). As such, in this example, three blade rows 146 include the triangular blades 148a while three blade rows 146 include truncated blades 148b.

The different types of blades 148 (e.g., triangular blades 148a, truncated blades 148b, etc.) in the blade rows 146 provide a number of benefits. In some examples, the triangular blades 148a provide a cutting and/or shredding functionality. In particular, the triangular blades 148a can cut/shred the food product that is in contact with the blade assembly 140. The truncated blades 148b can provide the cutting/shredding functionality while simultaneously moving the food product within the homogenizing chamber 116. For example, the truncated blades 148b can contact the food product that enters the homogenizing chamber 116 and cause the food product to move towards the dispensing opening 124 of the homogenizing chamber 116. Accordingly, the blades 148 of the blade rows 146 can cut/shred the food product that enters the homogenizing chamber 116 while simultaneously moving the food product to the dispensing opening 124, whereupon the cut/shredded food product exits the homogenizing chamber 116.

The plurality of blades 148 can be manufactured in various manners. In one example, the surface 151 of the blade assembly 140 can be formed from a thermoplastic material. Some or all of the plurality of blades 148 can be molded together with the surface 151, so as to form a monolithic structure. Serrations or other design features can similarly be molded.

Alternatively, as shown, the surface 151 of the blade assembly 140 can be formed from a thermoplastic material while the plurality of blades 148 can be formed of metal or other rigid materials. Each of the plurality of blades 148 can be individually manufactured (i.e., stamped, cast, etc.) and assembled together with the surface 151 of the blade assembly 140. As can be appreciated, the plurality of blades 148 can be removably or non-removably coupled to the surface 151. The blades 148, together arranged as the blade rows 146, can be attached to the surface 151 in any number of ways. For example, each of the blade rows 146 can be inserted into a linear slot formed in the surface 151 of the blade assembly 140. In other examples, however, the blade rows 146 can be attached to the surface 151 by fasteners (e.g., nuts, bolts, adhesives, mechanical fasteners, snap fit means, etc.).

The blade assembly 140 can include a ball-shaped support 156 disposed at the second end 154 of the blade assembly 140. In the illustrated example, the ball-shaped support 156 is located at a vertex of the generally conic shaped blade assembly 140. The ball-shaped support 156 includes a convex, rounded shape that extends outwardly from the surface 151 of the blade assembly 140. In some examples, the ball-shaped support 156 can contact the inner surface 150 (illustrated in FIG. 7) of the homogenizing chamber 116 so as to stabilize the blade assembly 140 with respect to the homogenizing chamber 116. As such, the ball-shaped support 156 can rotate within the homogenizing chamber 116 during rotation of the blade assembly 140.

The homogenizer assembly 30 can include a base portion 160. The base portion 160 is removably coupled to the homogenizing chamber 116 to retain the blade assembly 140 within the homogenizing chamber 116. In an example, a sealing element 162 is disposed between the first end 152 of the blade assembly 140 and the base portion 160. For example, the sealing element 162 can be received within a sealing recess 164 of the blade assembly 140, such that the sealing element 162 extends around the first end 152 of the blade assembly 140. The sealing element 162 can contact/engage an inner surface 166 of a wall 167 of the base portion 160, such that a seal is formed between the blade assembly 140 and the base portion 160. As such, food product that contacts the blade assembly 140 is generally limited from passing into an interior 168 of the base portion 160. The sealing element 162 is manufactured of a flexible, food-impermeable material such as rubber, silicone, etc.

It is to be appreciated that the sealing element 162 includes any number of shapes, such as a single, monolithic seal that provides multiple sealing points, multiple seals, or the like. While the sealing element 162 may include a generally uniform geometry when rotated about its central axis, it can also have a non-uniform geometry. As such, the sealing element 162 illustrated in FIG. 3 (and in FIG. 7) is not intended to be the only possible design for the sealing element 162. Indeed, the sealing element 162 of FIG. 3 can perform substantially the same function (e.g., limiting unintended passage of liquids past/through the sealing element 162) while including any number of differences in shape, dimensions, locations, etc.

The base portion 160 includes a base body 170 that has a generally rounded, circular shape. The base body 170 extends between a first side 172 and an opposing second side 174. Focusing upon the second side 174, the second side 174 defines the interior 168 of the base portion 160. The interior 168 has a size and shape (e.g., generally rounded) that substantially matches a size and shape of the first end 152 of the blade assembly 140. As such, in this example, the first end 152 of the blade assembly 140 can be received within the interior 168 of the base body 170. The base body 170 includes a base extension 176 that projects outwardly from the second side 174 towards the blade assembly 140. The base extension 176 defines a rounded, generally circular base opening 178 that extends through the base extension 176 to the first side 172 of the base body 170.

The base portion 160 includes one or more base attachment structures 180. In the illustrated example, the base attachment structures 180 include a pair of base attachment structures 180 that are positioned at substantially opposite sides of the base body 170. Such a position is not intended to be limiting, however, and, in other examples, the base attachment structures 180 may be positioned closer together so as not to be positioned on opposite sides of the base body 170. The base attachment structures 180 project outwardly from the wall 167 of the base body 170 and downwardly away from the blade assembly 140. In some examples, the base attachment structures 180 are molded together and/or formed with the base body 170, so as to form a monolithic structure. In other examples, however, the base attachment structures 180 can be separately attached/connected to the base body 170.

The base portion 160 includes one or more attachment devices 182. In the illustrated example, the attachment devices 182 include two attachment devices that are arranged on opposing sides of the base body 170. In at least one example, the attachment devices 182 include an attachment opening 184 that extends through the attachment devices 182. The attachment openings 184 are each sized/shaped so as to removably receive the base attachment structures 180 of the base body 170. The attachment devices 182 can further include an attachment catch 186 disposed at an opposite end of the attachment device 182 from the attachment opening 184. In some examples, the attachment catch 186 defines an outwardly projecting ledge, hook, or the like that can releasably grip the chamber attachment structures 130 of the homogenizing chamber 116.

In operation, the homogenizing chamber 116 can receive the blade assembly 140 while contacting the second side 174 of the base body 170. The homogenizing chamber 116 can be removably attached to the base body 170 of the base portion 160. For example, the attachment opening 184 of the attachment device 182 receives the base attachment structure 180, such that the base body 170 is generally non-movable/non-rotatable with respect to the attachment device 182. Simultaneously, the attachment catch 186 can engage and grip the chamber attachment structure 130 of the homogenizing chamber 116, such that the homogenizing chamber 116 is generally non-movable/non-rotatable with respect to the attachment device 182. As such, the attachment device 182 can attach the homogenizing chamber 116 to the base body 170 of the base portion 160, such that the blade assembly 140 is housed and supported within the homogenizing chamber 116.

Figure 4:
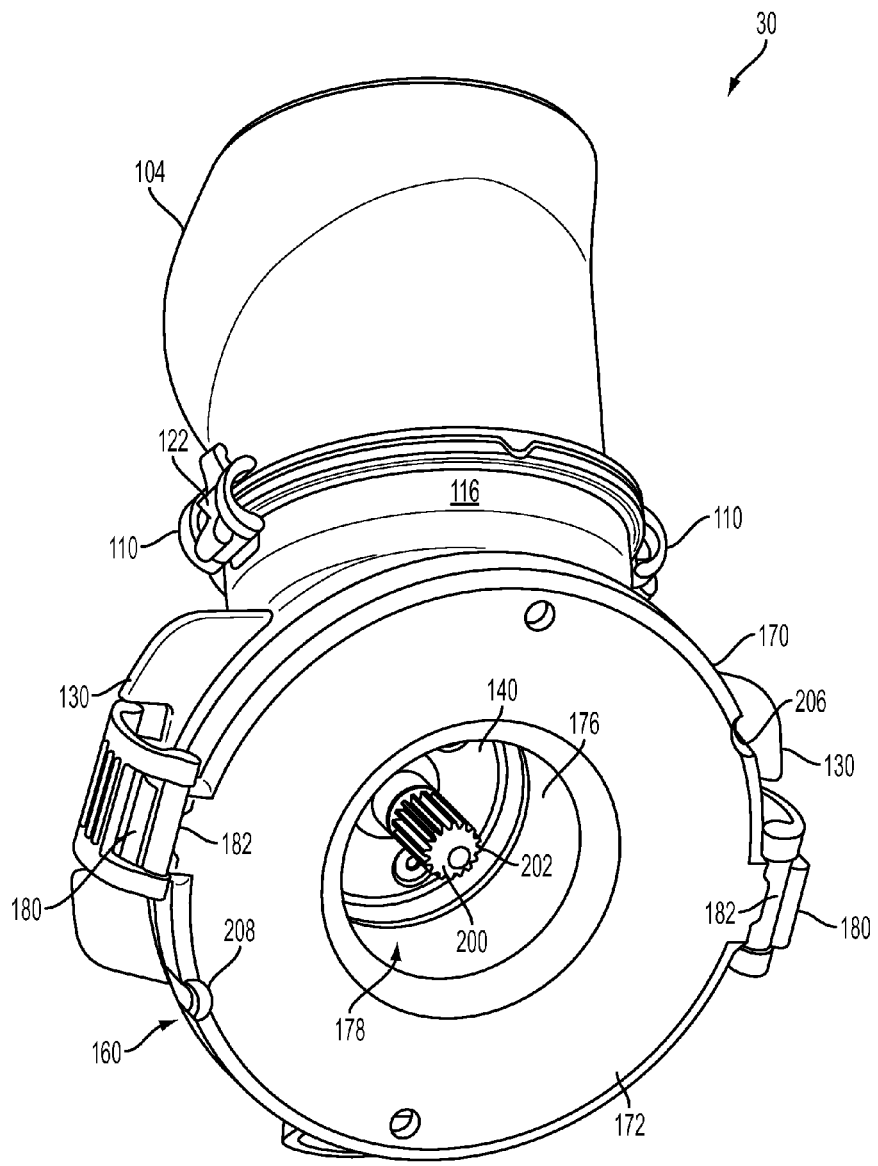
FIG. 4 is an underside perspective view of the homogenizer assembly.

Turning now to FIG. 4, an underside perspective view of the homogenizer assembly 30 is illustrated in a fully assembled state. In this example, the receiving structure 104 is removably attached to the homogenizing chamber 116 (e.g., by the receiving attachment structure 110 and the attachment structure 122). The homogenizing chamber 116, while receiving the blade assembly 140, is attached to the base body 170 of the base portion 160 (e.g., by the attachment device 182).

It will be appreciated that the receiving structure 104 illustrated in FIG. 4 may vary slightly in design/appearance as compared to the receiving structure 104 of FIG. 3. Indeed, the receiving structure 104 of FIGS. 3 and 4 can perform substantially the same function (e.g., defining a passageway to the blade assembly 140 from the cartridge 42) while having relatively minor differences in shape, dimensions, etc. In addition, it is to be understood that the receiving attachment structures 110 and/or the attachment structures 122 may vary slightly in design/appearance as compared to the receiving attachment structures 110 and/or the attachment structures 122 illustrated in FIGS. 3 and 4. Indeed, the receiving attachment structures 110 and the attachment structures 122 can perform substantially the same function (e.g., attaching the receiving structure 104 to the homogenizing chamber 116) while having relatively minor differences in shape, dimensions, etc.

In the illustrated example, the blade assembly 140 can include a driven shaft 200 within an interior of the blade assembly 140. It will be appreciated that the driven shaft 200 is illustrated with dashed lines in FIG. 3, as the driven shaft 200 is obscured from view by the surface 151 of the blade assembly 140. In some examples, the driven shaft 200 projects from a rear surface of the blade assembly 140 and is generally located within an interior of the blade assembly 140. The driven shaft 200 is oriented so as to extend through the base opening 178 of the base body 170. In some examples, the driven shaft 200 has a cross-sectional size (e.g., diameter in this example) that is smaller than a cross-sectional size (e.g., diameter in this example) of the base opening 178, such that a gap, space, or the like is between the driven shaft 200 and the base extension 176.

The driven shaft 200 can have a keyed geometry so as to allow for relatively easy engagement. For example, the driven shaft 200 may include one or more splines 202 (e.g., teeth, fins, projections, etc.) extending circumferentially along an outer surface of the driven shaft 200. The driven shaft 200 is not limited to the illustrated splines 202, and in other examples, may include a variety of shapes (e.g., polygonal, square, hexagonal, etc.) or the like so as to provide a keying feature.

The base portion 160 of the homogenizer assembly 30 can include one or more homogenizer connection features. In the illustrated example, the base portion 160 includes a first homogenizer connection feature 206 and a second homogenizer connection feature 208. The first homogenizer connection feature 206 and second homogenizer connection feature 208 define an opening, recess, gap, indentation, or the like in the base body 170 of the base portion 160. In this example, the first homogenizer connection feature 206 and second homogenizer connection feature 208 are positioned substantially opposite each other along an outer edge of the base body 170. In this example, the first homogenizer connection feature 206 and second homogenizer connection feature 208 define a substantially rounded indentation in the outer edge of the base body 170. It will be appreciated, however, that the connection features 206, 208 include any number of sizes, profiles, etc., including rectangular indentations with substantially planar sides or the like.

Figure 5:
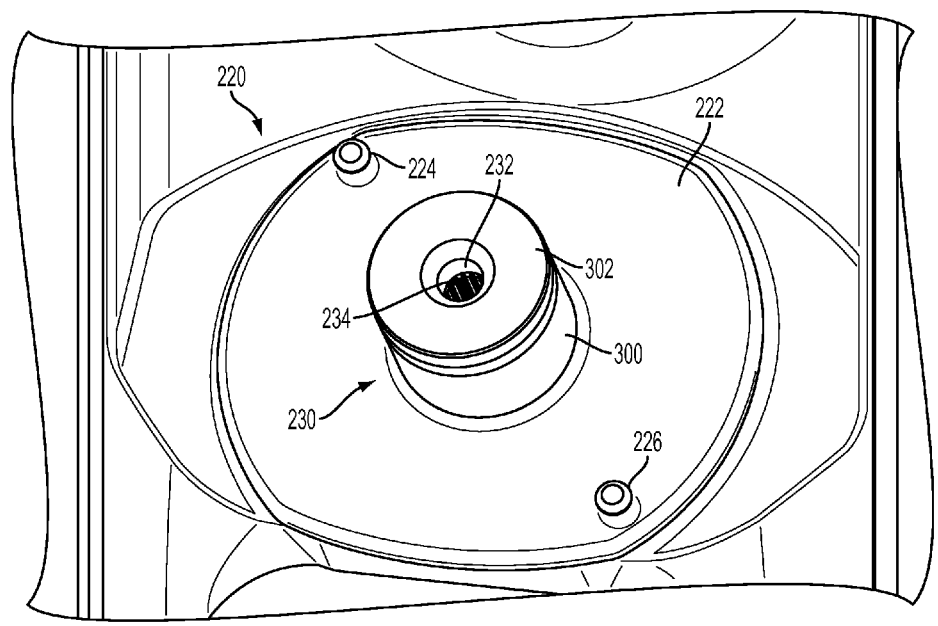
FIG. 5 is a perspective view of an example drive assembly base that removably supports the homogenizer assembly of FIG. 4.

Turning now to FIG. 5, a drive assembly base 220 for removably supporting the homogenizer assembly 30 (illustrated in FIGS. 3 and 4) is illustrated. It will be appreciated that in this example, the drive assembly base 220 is illustrated separate from the homogenizer assembly 30 for ease of illustration and to more clearly illustrate portions of the drive assembly base 220. In operation, however, the homogenizer assembly 30 may be attached to and/or supported by the drive assembly base 220.

The drive assembly base 220 includes a base portion 222. The base portion 222 defines a substantially planar surface onto which the homogenizer assembly 30 can be supported. In an example, the base portion 222 includes one or more attachment structures. For example, the one or more attachment structures include a first attachment structure 224 and a second attachment structure 226. The first attachment structure 224 and second attachment structure 226 are spaced substantially the same distance apart as the connection features 206, 208 (illustrated in FIG. 4) of the base body 170. The first attachment structure 224 and second attachment structure 226 are disposed at diagonally opposite corners of the base portion 222. In the illustrated example, the first attachment structure 224 is positioned at an upper left corner while the second attachment structure 226 is diagonally opposed and positioned at a lower right corner.

The first attachment structure 224 and second attachment structure 226 protrude outwardly from the base portion 222. In this example, the first attachment structure 224 and second attachment structure 226 are substantially identical in size/shape/structure. In other examples, however, the first attachment structure 224 and second attachment structure 226 can have different sizes, shapes, and/or structures. It will be appreciated that FIG. 5 illustrates two attachment structures 224, 226 though, in other examples, the attachment structures 224, 226 may include any number of attachment structures (e.g., one or more attachment structures), such as by including three attachment structures, four attachment structures, etc. The first attachment structure 224 and second attachment structure 226 are not limited to being positioned at diagonally opposite corners of the base portion 222, and in other examples, could be positioned at any number of locations on the base portion 222.

The drive assembly base 220 can include a mating portion 230. The mating portion 230 extends outwardly from the base portion 222. In this example, the mating portion 230 is located at a center of the base portion 222 between and substantially equidistant from the first attachment structure 224 and second attachment structure 226. In particular, first attachment structure 224, mating portion 230, and second attachment structure 226 are substantially collinear. The mating portion 230 is not limited to the illustrated position, however, and in some examples, the mating portion 230 may be off-center from the base portion 222, located closer to the first attachment structure 224 or the second attachment structure 226, etc.

The mating portion 230 defines a mating opening 232 that extends through the mating portion 230. In an example, the mating opening 232 has a cross-sectional size and shape that substantially matches a cross-sectional size and shape of the driven shaft 200 (illustrated in FIG. 4). In this example, the mating opening 232 has a substantially circular cross-sectional shape that matches the substantially circular cross-sectional shape of the driven shaft 200. In other examples, however, the mating opening 232 is not limited to such a shape, and may include other polygonal shapes (e.g., squares, rectangles, triangles, etc.) that may or may not match the shape of the driven shaft 200.

The mating opening 232 can have a keyed geometry so as to allow for engagement between the driven shaft 200 and the mating opening 232. In this example, the mating opening 232 includes one or more splines 234 (e.g., teeth, fins, projections, etc.) that extend circumferentially around an inner surface of the mating opening 232. The splines 234 can substantially match a size/shape of the splines 202 of the driven shaft 200, such that the splines 202, 234 can engage and mate. This engagement/mating allows for the driven shaft 200 to be removably received within the mating opening 232. It will be appreciated that the mating opening 232 is not limited to the illustrated splines 234, and in other examples, may include a variety of shapes (e.g., polygonal, square, hexagonal, etc.) that provide a keying feature. In some examples, these shapes (e.g., polygonal, square, hexagonal, etc.) may match the shape of the driven shaft 200.

Figure 6:
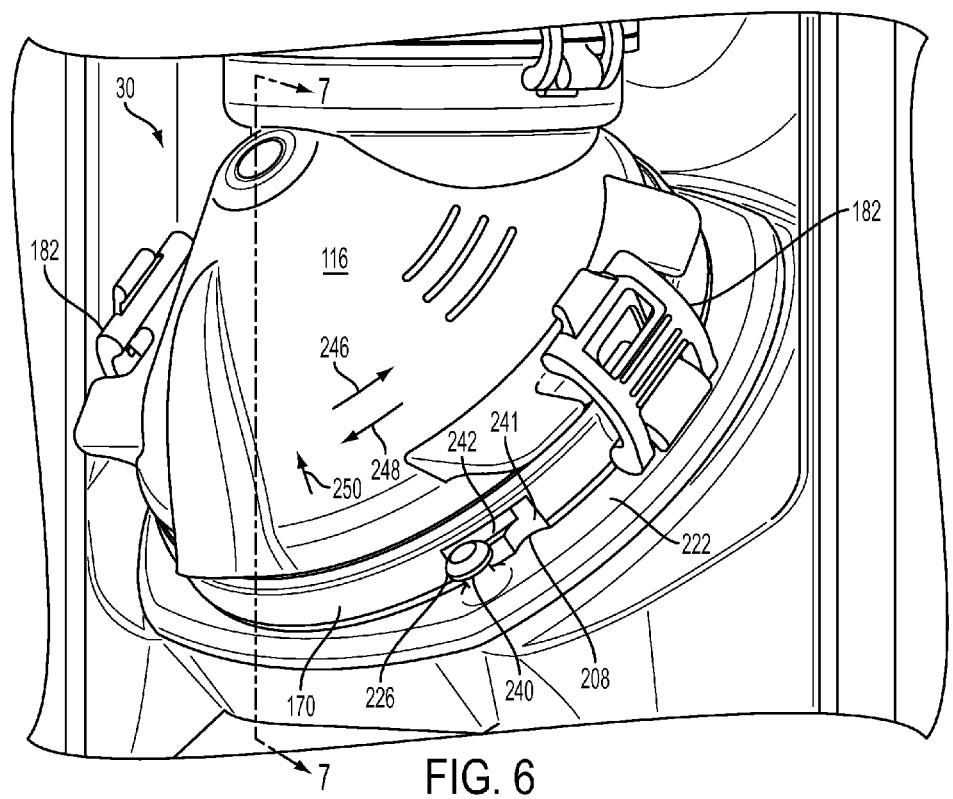
FIG. 6 is a perspective view of the homogenizer assembly attached to the drive assembly base.

Turning now to FIG. 6, the engagement between the homogenizer assembly 30 and the base portion 222 of the drive assembly base 220 is illustrated. Though obstructed from view in FIG. 6 (and illustrated more clearly in FIG. 7), the mating opening 232 of the drive assembly base 220 receives the drive shaft 200 of the blade assembly 140. Similarly, the mating portion 230 of the drive assembly base 220 is received within the base opening 178 of the blade assembly 140.

The homogenizer assembly 30 can be removably attached to the base portion 222 of the drive assembly base 220. It will be appreciated that the second homogenizer connection feature 208 and the second attachment structure 226 is illustrated in FIG. 6, while the first homogenizer connection feature 206 and the first attachment structure 224 are obstructed from view. The first attachment structure 224 is substantially identical in size, shape, and structure to the second attachment structure 226. As such, an engagement between the first homogenizer connection feature 206 and the first attachment structure 224 is generally identical to the illustrated engagement between the second homogenizer connection feature 208 and the second attachment structure 226.

In an example, the first attachment structure 224 and second attachment structure 226 each include a ledge 240 that defines an enlarged cross-sectional size. The ledge 240 is disposed at an end of each of the attachment structures 224, 226. The ledge 240 is sized and shaped to be received within an opening 241 and a recess 242 of the second homogenizer connection feature 208. Though obstructed from view, the first homogenizer connection feature 206 includes an identical opening 241 and recess 242. In the illustrated example, the attachment structures 224, 226 are inserted into the corresponding openings 241 of the homogenizer connection features 206, 208. To secure the homogenizer assembly 30 with respect to the base portion 222, the homogenizer assembly 30 can be rotated in a first direction 246. Rotation of the homogenizer assembly 30 causes the ledge 240 of the attachment structures 224, 226 to move within the recess 242 of the homogenizer connection features 206, 208. In this example, the first direction 246 is counter-clockwise, but in other examples, the first direction 246 may be clockwise. The ledge 240 is received within the recess 242, such that inadvertent removal of the homogenizer assembly 30 with respect to the base portion 222 is limited.

To remove the homogenizer assembly 30 from the base portion 222, the homogenizer assembly 30 can be rotated in a second direction 248. In this example, the second direction 248 is clockwise and is substantially opposite the first direction 246. In other examples, however, the second direction 248 may be counter-clockwise. As the homogenizer assembly 30 is moved in the second direction 248, the ledge 240 moves with respect to the recess 242. The homogenizer assembly 30 can continue to move in the second direction 248 until the ledge 240 is aligned with the opening 241. Upon alignment, the homogenizer assembly 30 can be moved in a removal direction 250 (e.g., in a direction away from the base portion 222), such that the ledge 240 of the attachment structures 224, 226 can pass through the opening 241 of the homogenizer connection feature 206, 208. As such, the homogenizer assembly 30 can be removably attached with respect to the base portion 222.

Figure 7:
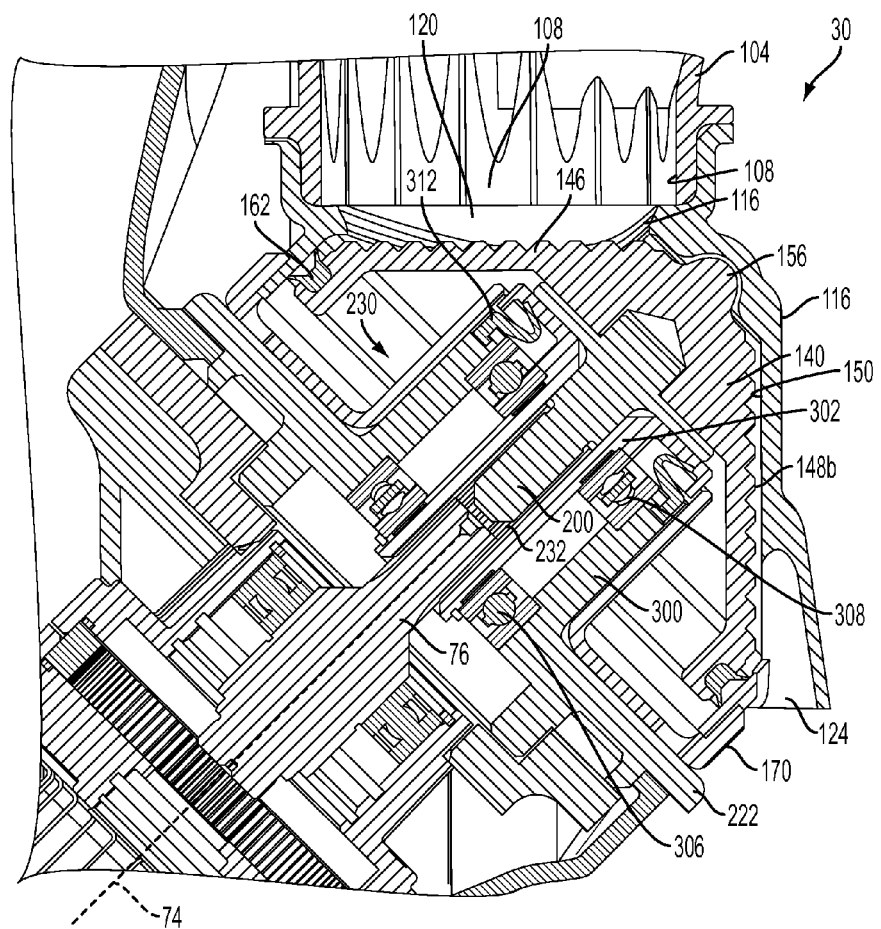
FIG. 7 is a sectional view of the homogenizer assembly attached to the drive assembly base along line 6-6 of FIG. 6.

Turning now to FIG. 7, a sectional view of the homogenizer assembly 30 and drive assembly base 220 is illustrated along line 7-7 of FIG. 6. In this example, the blade assembly 140 is positioned within the homogenizing chamber 116. In the illustrated example, the mating portion 230, extending along the rotation axis 74, includes an outer sleeve 300 and an inner sleeve 302. The outer sleeve 300, also illustrated in FIG. 5, defines an outer portion of the mating portion 230. The outer sleeve 300 can substantially surround at least a portion of the inner sleeve 302. In particular, the outer sleeve 300 has a larger cross-sectional size (e.g., diameter) than the inner sleeve 302. In some examples, the outer sleeve 300 is attached to and/or formed with the base portion 222 of the drive assembly base 220, such that the outer sleeve 300 is generally non-movable/non-rotatable with respect to the base portion 222.

The inner sleeve 302, which defines the mating opening 232, is received within and extends through the outer sleeve 300. In an example, the inner sleeve 302 is supported with respect to the outer sleeve 300 by at least one bearing. In this example, the at least one bearing (e.g., a first bearing 306 and a second bearing 308) is positioned radially between the inner sleeve 302 and the outer sleeve 300. It will be appreciated, however, that any number of bearings (e.g., one or more) can be provided. The bearings 306, 308 allow for at least some degree of movement between an inner surface and an outer surface of the bearings 306, 308. For example, an inner surface of the bearings 306, 308 contacts and/or is attached to the inner sleeve 302 while an outer surface of the bearings 306, 308 contacts and/or is attached to the outer sleeve 300. As such, the bearings 306, 308 can allow for the inner sleeve 302 to rotate with respect to the outer sleeve 300. In some examples, a sealing device 312 contacts the outer sleeve 300 and inner sleeve 302 so as to limit spillage between the outer sleeve 300 and inner sleeve 302.

In operation, the driving motor 72, via the drive shaft 76 engaging the mating opening 232, engages and rotates the mating portion 230. In particular, the drive shaft 76 can engage the mating opening 232 in any number of ways. In one possible example, the drive shaft 76 may include one or more splines, so as to engage the splines 234 of the mating opening 232. In another possible example, the drive shaft 76 may be fixedly attached to the mating opening 232. In these examples, rotation of the drive shaft 76 causes corresponding rotation of the inner sleeve 302. Due to the bearings 306, 308 contacting the outer sleeve 300 and inner sleeve 302, the inner sleeve 302 can rotate while the outer sleeve 300 does not rotate.

In this example, the driven shaft 200, when received within the mating opening 232 of the mating portion 230, extends along the rotation axis 74. The splines 202 of the driven shaft 200 mate with and engage the splines 234 of the mating opening 232. As such, the rotation of the inner sleeve 302 of the mating portion 230 by the driving motor 72 can cause rotation of the driven shaft 200. This rotation of the driven shaft 200 likewise causes rotation of the blade assembly 140 about the rotation axis 74.

Turning now to FIGS. 8 and 9, an example operation of the homogenizer system 22 will be described. Referring to FIG. 8, the first end 44 of the cartridge 42 is inserted into the receiving structure 104. The cartridge 42 may initially be tipped during the insertion process. However, upon completion of the insertion process, the cartridge 42 is generally vertically oriented, as illustrated.

In some examples, the receiving structure 104 is sized/shaped to receive, in a mating fashion, the first end 44 of the cartridge 42. For example, the receiving structure 104 may have a shape that substantially matches the shape of the first end 44 of the cartridge 42, while being slightly larger in size than the cartridge 42. In some possible examples, the receiving structure 104 includes a polygonal cross-sectional opening defined by one or more planar sides. In such an example, the first end 44 of the cartridge 42 may have a substantially matching shape (e.g., polygonal cross-sectional shape defined by one or more planar sides). Upon being received within the receiving structure 104, the cartridge 42 is non-rotatable with respect to the receiving structure 104. In particular, the first end 44 of the cartridge 42 can engage/contact the planar sides of the receiving structure 104, such that the cartridge 42 is limited from rotating.

During operation of the homogenizer system 22, it will be appreciated that the plunger 50 is inserted/moved into/through the interior 48 of the cartridge 42. More particularly, the plunger 50 is movably supported at the second end 46 of the cartridge 42 as a starting point (see briefly FIG. 2). The food product (shown within FIG. 8 as item 350) is positioned within the interior 48 of the cartridge 42 from the first end 44 of the cartridge 42 towards the second end 46. In the illustrated example, the food product 350 is located on a first side of the plunger 50. As mentioned, the food product 350 includes any number/type of food product, including, but not limited to, frozen fruits, nuts, chocolates, ice cream, ice, etc. However, as mentioned, a particular example food product is frozen fruit, such as banana pieces.

In at least some examples, the homogenizer system 22 may include a sensor assembly 47. The sensor assembly 47 (illustrated generically/schematically in FIGS. 2, 8 and 9) includes any number of structures and locations. In this example, the sensor assembly 47 is positioned adjacent and the receiving structure 104 within the homogenizer housing 32. The sensor assembly 47 includes any number of sensors, such as optical sensors, or the like. In these examples, the sensor assembly 47 can sense/detect that the cartridge 42 is properly inserted and received within the receiving structure 104. The sensor assembly 47 is not limited to the illustrated location, however, and in other examples, could be located higher or lower than as shown, or at other locations within the homogenizer housing 32. Likewise, the sensor assembly 47 is not limited to including a single sensor, and, instead, may include a plurality of sensors positioned at different locations within the homogenizer housing 32. In one possible example, the sensor assembly 47 can alert a user (e.g., visual alert, audible alert, etc.) if the cartridge 42 is or is not properly positioned within the receiving structure 104.

As can be seen within the section views of FIGS. 8 and 9, the force application device 60 is located within the homogenizer housing 32 at a location above the receiving structure 104 and the cartridge 42 received within the receiving structure 104. As previously illustrated within FIG. 2, the force application device 60 has an initial starting position that does not engage the cartridge 42 and the plunger 50 located at the second end 46. Also, the force application device 60 is connected to/can include an electrical motors, gears, etc. that are operable to provide movement and thus the applied force. It is to be appreciated that these structures (e.g., motors, gears, etc.) can have various constructions, configurations, etc. and thus need not be specific limitations upon the aspects of the present invention.

As illustrated in FIG. 8, the force application device 60 is moved in a downward direction 352 (illustrated generically/schematically with the arrowhead designated 352) into contact with the plunger 50. Before and/or upon contacting the plunger 50, the force application device 60 is rotated 354 about a rotation axis 356. During this rotation, the force application device 60 can cause the plunger 50 to rotate with respect to the cartridge 42 as the plunger 50 moves in the downward direction 352. Due to the second end 46 of the cartridge 42 engaging/contacting the receiving structure 104, the cartridge 42 is generally limited from rotating. The force application device 60 can therefore rotate the plunger 50 such that the plunger 50 is oriented with respect to the blade assembly 140. By being oriented with respect to the blade assembly 140, a shape (e.g., rounded, curved, etc.) of the plunger 50 is oriented to match the generally rounded shape of the blade assembly 140.

As the force application device 60 is moved in the downward direction 352, the force application device 60 can apply a force to the food product 350. In particular, the force application device 60 applies a force to the second side of the plunger 50, causing the plunger 50 to move towards the first end 44 of the cartridge 42. As such, the plunger 50 and the food product 350 are movable with respect to the cartridge 42 towards the blade assembly 140 of the homogenizer system 22. This movement in the downward direction 352 causes the food product 350 to be supplied/dispensed from the interior 48 of the cartridge 42 and out of the first end 44.

Before and/or during this dispensing of the food product 350, the blade assembly 140 is driven by the drive assembly 70. In an example, the driving motor 72 of the drive assembly 70 directly or indirectly supplies rotational movement about the rotation axis 74. The driving motor 72 can engage and rotate the drive shaft 76, which is attached to an output shaft of the driving motor 72. As described above with respect to FIG. 7, the drive shaft 76 engages the mating opening 232 so as to cause rotation of the blade assembly 140 about the rotation axis 74.

The food product 350 that is supplied/dispensed from the cartridge 42 can enter an interior of the homogenizing chamber 116 so as to make contact with the blade assembly 140. In an example, the blade assembly 140 can rotate about the rotation axis 74 at a sufficiently high rate of speed to cause the food product 350 to be shredded and/or homogenized to form a soft texture with a similar consistency to ice cream or sherbet. The blade rows 146, comprising the plurality of blades 148, provide a number of functions. In an example, the triangular blades 148a cut, shred, and/or homogenize the food product 350. In an example, the truncated blades 148b provide the cutting, shredding, and/or homogenizing functionality, while simultaneously moving the food product 350 within the homogenizing chamber 116 towards the dispensing opening 124. In some examples, interaction between the food product 350 and the blades 148 of the blade rows 146 forms a homogenized product 360 that exits through the dispensing opening 124 in the homogenizing chamber 116. The container 38, positioned below the dispensing opening 124, receives the homogenized product 360.

Turning now to FIG. 9, the force application device 60 continues to move in the downward direction 352 until it is in a fully extended position, as illustrated in FIG. 9. In the fully extended position, a majority of the food product 350 has been shredded and/or homogenized to form the homogenized product 360, with a minimal amount of food product 350 remaining between the plunger 50 and the blade assembly 140.

Figure 10:
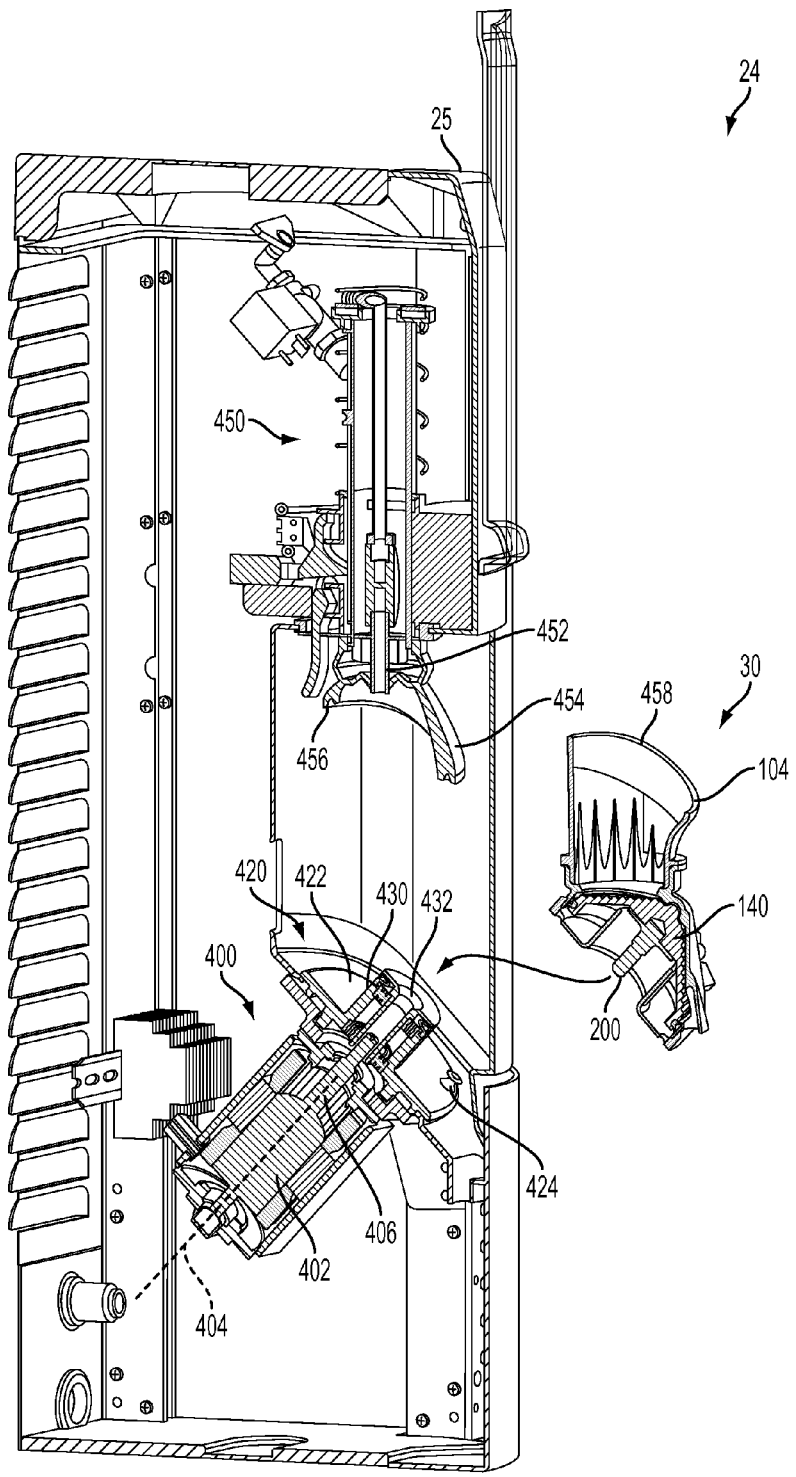
FIG. 10 is a sectional view of the rinse system along line 10-10 of FIG. 2 in which the homogenizer assembly is initially separated from the rinse system.

Turning now to FIG. 10, a sectional view of an example of the rinse system 24 is illustrated along line 10-10 of FIG. 1. It will be appreciated that not all of the internal structures are illustrated in FIG. 10 for ease of illustration. Indeed, in some examples, the rinse system 24 may include electronics/circuitry, mechanical structures (pumps, gears, actuators, etc.), pipes, tubes, or the like.

The rinse system 24 includes a drive assembly 400. The drive assembly 400 is generally identical to the drive assembly 70 of the homogenizer system 22. Indeed, the drive assembly 400 includes a driving motor 402 (generally identical to the driving motor 72), a rotation axis 404 (generally identical to the rotation axis 74), and a drive shaft 406 (generally identical to the drive shaft 76) that extends along the rotation axis 404 from the driving motor 402. As such, the driving motor 402, rotation axis 404, and the drive shaft 406 need not be described in detail again.

The rinse system 24 includes a drive assembly base 420. The drive assembly base 420 is generally identical to the drive assembly base 220 of the homogenizer system 22. Indeed, the drive assembly base 420 includes a base portion 422 (generally identical to the base portion 222) and one or more attachment structures 424 (generally identical to the first attachment structure 224 and second attachment structure 226). The drive assembly base 420 includes a mating portion 430 (generally identical to the mating portion 230) that extends from the base portion 422 and a mating opening 432 (generally identical to the mating opening 232). In some examples, the mating opening 432 includes a keying feature, such as splines, teeth, or the like. As such, the drive assembly base 420, base portion 422, first attachment structure 424, mating portion 430, and mating opening 432 need not be described in detail again.

The rinse system 24 includes a dispenser assembly 450 disposed above and spaced apart from the drive assembly base 420. The dispenser assembly 450 includes a dispenser tube 452. The dispenser tube 452 of the dispenser assembly 450 is an elongated pipe, hose, conduit, duct, etc. through which a liquid, such as water, water with soap, etc. can be dispensed. It will be appreciated that the dispenser tube 452 includes any number of sizes, shapes, and constructions, and is not limited to the example illustrated herein. For example, the dispenser tube 452 can have a larger or smaller cross-sectional size (e.g., diameter), such that nearly any amount liquid can be provided through the dispenser tube 452.

The dispenser tube 452 is housed at least partially within a dispenser cover 454. The dispenser cover 454 includes an asymmetrical, rounded dome shape within which an end of the dispenser tube 452 extends. The dispenser cover 454 includes any number of materials, though, in at least one example, includes a material that has at least some degree of flexibility, such as an elastomer-type material. In the illustrated example, a front portion of the dispenser cover 454 projects downwardly towards the drive assembly base 420 a greater distance than a rear portion of the dispenser cover 454. It will be appreciated, however, that the dispenser cover 454 is not limited to the illustrated size/shape, and includes any number of sizes or shapes. In at least one example, the dispenser cover 454 has a cross-sectional size/shape that substantially matches a cross-sectional size/shape of the receiving structure 104.

The dispenser cover 454 may include an engagement feature 456. In this example, the engagement feature 456 is located along an end wall of the dispenser cover 454. While the engagement feature 456 includes any number of structures/constructions, in the illustrated example, the engagement feature 456 defines a channel projecting into the end wall of the dispenser cover 454. The engagement feature 456 can be sized to receive at least a portion of the wall 458 of the receiving structure 104. By receiving the wall 458 of the receiving structure 104, the engagement feature 456 can connect the dispenser cover 454 with respect to the receiving structure 104 so as to limit the egress of liquid through the dispenser cover 454 and/or the receiving structure 104.

Figure 11:
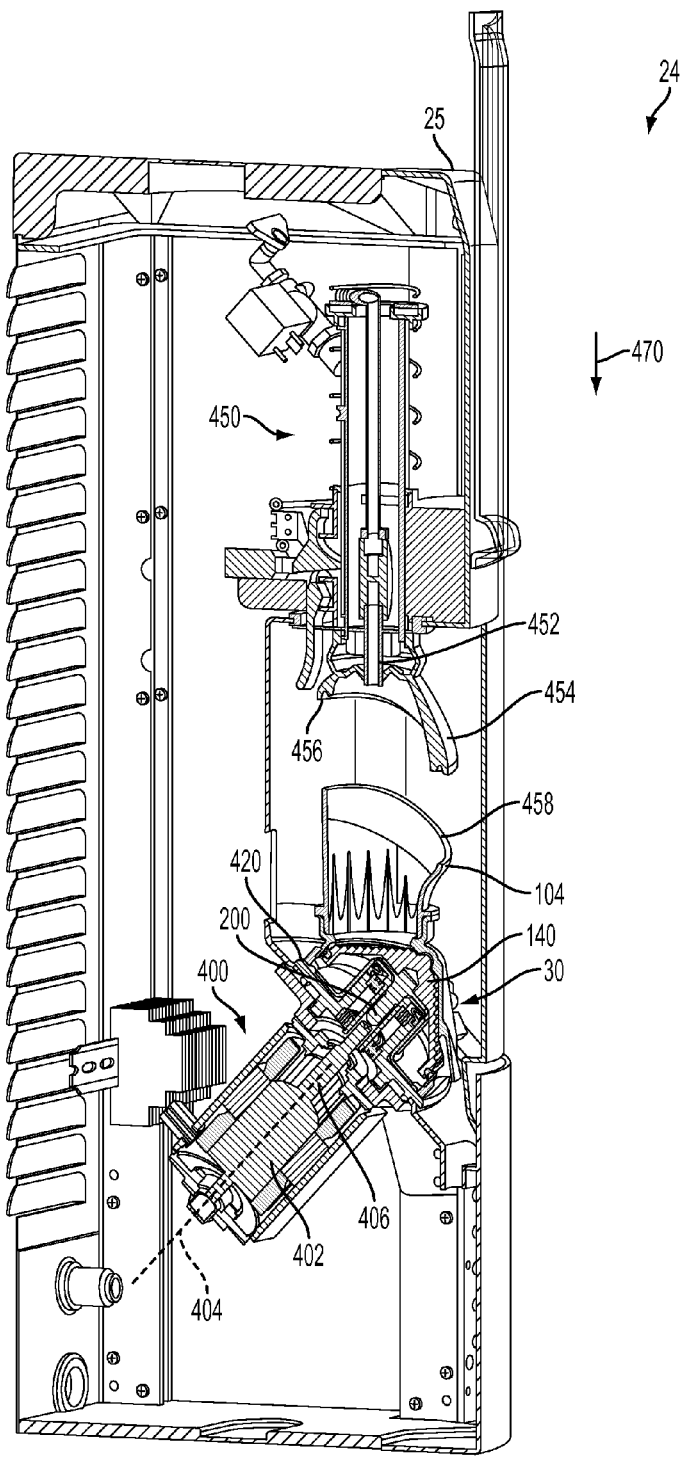
FIG. 11 is a sectional view of the rinse system similar to FIG. 10, but with the homogenizer assembly attached to a drive assembly base.

Turning now to FIG. 11, the homogenizer assembly 30 can be attached with respect to the drive assembly base 420. In this example, the driven shaft 200 of the blade assembly 140 can be inserted into the mating opening 432 of the mating portion 430. The homogenizer connection features 206, 208 (illustrated in FIG. 4) can be attached with respect to the attachment structure 424 (illustrated in FIG. 10) of the drive assembly base 420. As such, driving motor 402 can cause the drive shaft 406 to rotate, thus causing rotation of the blade assembly 140 when desired.

Figure 12:
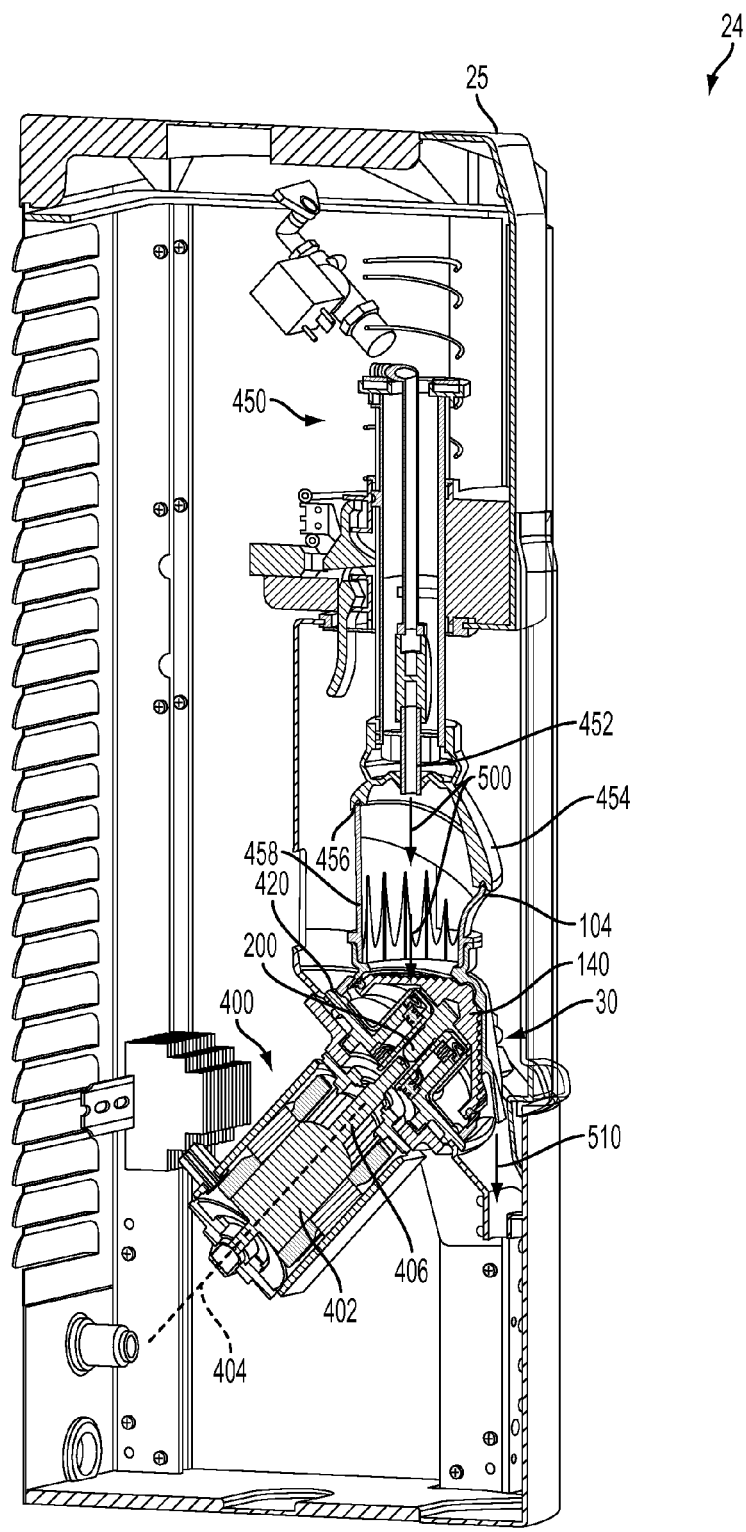
FIG. 12 is a sectional view of the rinse system similar to FIG. 11, but with an example dispenser assembly dispensing a liquid to the blade assembly for cleaning of the blade assembly.

Turning now to FIG. 12, with the homogenizer assembly 30 attached to the drive assembly base 420, the dispenser assembly 450 can be moved in a downward direction (illustrated generically/schematically with arrowhead 470 in FIG. 11) to engage the homogenizer assembly 30. In this example, the engagement feature 456 can contact and receive at least a portion of the wall 458 of the receiving structure 104 in a mating fashion. After this mating between the dispenser cover 454 and the receiving structure 104, the blade assembly 140 can be rotated by the driving motor 402. In some examples, the speed at which the blade assembly 140 rotates may be similar or identical to the speed at which the blade assembly 140 rotates during shredding/homogenizing in the homogenizer system 22. In other examples, however, the speed at which the blade assembly 140 rotates may be faster or slower than the blade assembly 140 rotational speed within the homogenizer system 22.

Before or during the rotation of the blade assembly 140, liquid 500 (illustrated generically with arrowhead 500) is dispensed from the dispenser assembly 450. For example, the liquid 500 can pass through the dispenser tube 452 whereupon the liquid 500 is directed through the receiving structure 104. Due, at least in part, to the engagement feature 456 mating with the wall 458 of the receiving structure 104, inadvertent spillage of the liquid 500 is substantially limited. The liquid 500 can pass through the receiving opening 120 in the homogenizing chamber 116 and contact the rotating blade assembly 140, including the blade rows 146, blades 148, etc., so as to clean the blade assembly 140. It will be appreciated that the liquid 500 can remove some or all of the food byproduct that is present on the blade assembly 140 from operation within the homogenizer system 22. For example, the liquid 500 can remove fruit pieces, ice, liquid or semi-liquid materials, etc. Rotation of the blade assembly 140 ensures that substantially all of the blade assembly 140 is contacted by the liquid 500 to ensure a relatively thorough cleaning.

The liquid 500, along with any food byproduct, can exit through the dispensing opening 124 as a cleaned fluid 510 (illustrated generically/schematically with arrowhead). The cleaned fluid 510 can be collected and/or disposed of in any number of ways. In some examples, the cleaned fluid 510 can pass through an opening, drain, or the like for disposal. In another example, the cleaned fluid 510 can pass through a filter (e.g., a grate, mesh grid, etc.) to separate the food byproduct from the liquid. The filter can then be periodically removed, with the food product disposed of. In yet another example, the cleaned fluid 510 can be collected in a container, whereupon the contents of the container can be periodically disposed of.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A food homogenizer including:
   a drive assembly including a driving motor, the driving motor engaging a rotatable mating portion that extends along a rotation axis;
   a homogenizer assembly removably attached with respect to the drive assembly, the homogenizer assembly including:
   a receiving structure;
   a homogenizing chamber;
   a blade assembly positioned within the homogenizing chamber; and
   a driven shaft that extends from the blade assembly along the rotation axis, wherein the driven shaft is received within the mating portion such that rotation of the mating portion by the driving motor causes rotation of the blade assembly about the rotation axis; and
   an exchangeable cartridge for providing a supply of frozen food product to the homogenizer assembly, the cartridge being removably received at the receiving structure of the homogenizer assembly to permit discharge of the food product to the homogenizing chamber while the cartridge is positioned adjacent to the homogenizing chamber.

2. The food homogenizer of claim 1, wherein the mating portion includes a mating opening into which the driven shaft of the blade assembly is received.

3. The food homogenizer of claim 2, wherein the mating opening includes a plurality of splines that are configured to mate with splines of the driven shaft when the driven shaft is received within the mating opening.

4. The food homogenizer of claim 3, wherein the mating portion includes an inner sleeve received within an outer sleeve, the outer sleeve having a larger cross-sectional size than the inner sleeve.

5. The food homogenizer of claim 4, wherein the inner sleeve defines the mating opening, the inner sleeve being rotatable by the driving motor with respect to the outer sleeve.

6. The food homogenizer of claim 5, wherein the mating portion includes at least one bearing positioned radially between the inner sleeve and the outer sleeve.

7. The food homogenizer of claim 1, wherein the blade assembly includes one or more blade rows, each blade row including a plurality of blades.

8. The food homogenizer of claim 7, wherein the plurality of blades in at least one of the blade rows includes triangular blades.

9. The food homogenizer of claim 8, wherein the plurality of blades in at least one of the blade rows includes truncated blades that have a triangular shape with a flattened peak.

10. A food homogenizer including:
    a drive assembly including a driving motor, the driving motor engaging a rotatable mating portion that extends along a rotation axis;
    a homogenizer assembly removably attached with respect to the drive assembly, the homogenizer assembly including:
    a receiving structure having a receiving opening;
    a homogenizing chamber;
    a blade assembly disposed within the homogenizing chamber; and
    a driven shaft that extends from the blade assembly along the rotation axis, wherein the driven shaft is received within the mating portion such that rotation of the mating portion by the driving motor causes rotation of the blade assembly about the rotation axis;

a supply assembly including an exchangeable cartridge configured to engage the receiving opening in the receiving structure the homogenizing chamber, the cartridge of the supply assembly containing a food product that is configured to be supplied to an interior of the homogenizing chamber such that rotation of the blade assembly homogenizes the food product.

11. The food homogenizer of claim 10, wherein the receiving structure is removably attached to the homogenizing chamber.

12. The food homogenizer of claim 11, wherein the homogenizer assembly includes a dispensing opening disposed substantially opposite the receiving opening and through which the homogenized food product is configured to exit the homogenizing chamber.

13. The food homogenizer of claim 10, wherein the blade assembly includes a generally conic geometry.

14. The food homogenizer of claim 13, wherein the blade assembly includes one or more blade rows extending from a first end to an opposing second end of the blade assembly.

15. The food homogenizer of claim 14, wherein the blade assembly includes at least one depression disposed between adjacent blade rows.

* * * * *